United States Patent [19]
Skinner et al.

[11] Patent Number: 5,377,209
[45] Date of Patent: Dec. 27, 1994

[54] TELECOMMUNICATIONS SYSTEM DATA ALIGNMENT EQUIPMENT AND METHOD

[75] Inventors: Ian J. Skinner; Geoffrey Chopping; Andrew K. Borland, all of Wimborne; Ernest Culley, Broadstone, all of England

[73] Assignee: GPT Limited, Coventry, England

[21] Appl. No.: 988,744

[22] Filed: Dec. 10, 1992

[30] Foreign Application Priority Data

Dec. 13, 1991 [GB] United Kingdom ............... 9126505

[51] Int. Cl.⁵ ........................... H04J 3/06; H04L 7/00
[52] U.S. Cl. .................. 370/105.1; 371/47.1; 375/108; 375/116
[58] Field of Search ............... 370/100.1, 105, 105.1, 370/105.2, 105.4, 106, 16; 375/106, 108, 114, 116; 371/47.1, 41, 42, 7, 8.1, 11.1

[56] References Cited

U.S. PATENT DOCUMENTS

| | | | |
|---|---|---|---|
| 4,142,070 | 2/1979 | Laudauer et al. | 370/105 |
| 4,214,124 | 7/1980 | Jarus | 375/114 |
| 4,596,981 | 6/1986 | Ueno et al. | 370/105.4 |
| 4,768,192 | 8/1988 | Pattavina et al. | 370/105.1 |
| 4,849,995 | 7/1989 | Takeo et al. | 375/116 |
| 4,943,985 | 7/1990 | Gherardi | 375/111 |

FOREIGN PATENT DOCUMENTS

0212327  3/1987  European Pat. Off. .
2143406  2/1985  United Kingdom .

*Primary Examiner*—Douglas W. Olms
*Assistant Examiner*—Hassan Kizou
*Attorney, Agent, or Firm*—Kirschstein, Ottinger, Israel & Schiffmiller

[57] ABSTRACT

Synchronization of a receiving termination of a telecommunications system with an incoming data stream is carried out from a synchronization signal carried with the data stream. It is possible that a "mimic" of the synchronization signal may occur within the data stream. Two frame alignment detectors operate in worker/standby relationship, one being locked to a detected synchronization signal and the second searching for an alternative signal. Verification is carried out using a cyclic redundancy check.

10 Claims, 1 Drawing Sheet

TELECOMMUNICATIONS SYSTEM DATA ALIGNMENT EQUIPMENT AND METHOD

BACKGROUND OF THE INVENTION

On a telecommunications system where data is transmitted within timeslots, synchronisation of the receiving termination with the data stream is achieved by detection of timeslot zero (TSO) synchronisation signals. It is possible for the data in a timeslot other than TSO to "mimic" the TSO signals, either accidentally or even as a result of deliberate interference. This mimic will obviously create confusion as to which is the real TSO synchronisation signal.

SUMMARY OF THE INVENTION

The present invention is concerned with means for overcoming the problems.

According to the present invention there is provided a telecommunications system wherein data is transmitted in timeslots, comprising means for detecting current and mimic alignment signals, means for validating the alignment signals and means for synchronising the system to a valid alignment signal.

BRIEF DESCRIPTION OF THE DRAWING

The present invention will now be described, by way of example, with reference to the accompanying single figure, FIG. 1, which shows a block diagram of a frame synchronization circuit.

DESCRIPTION OF THE PREFERRED EMBODIMENTS

Figure 1:
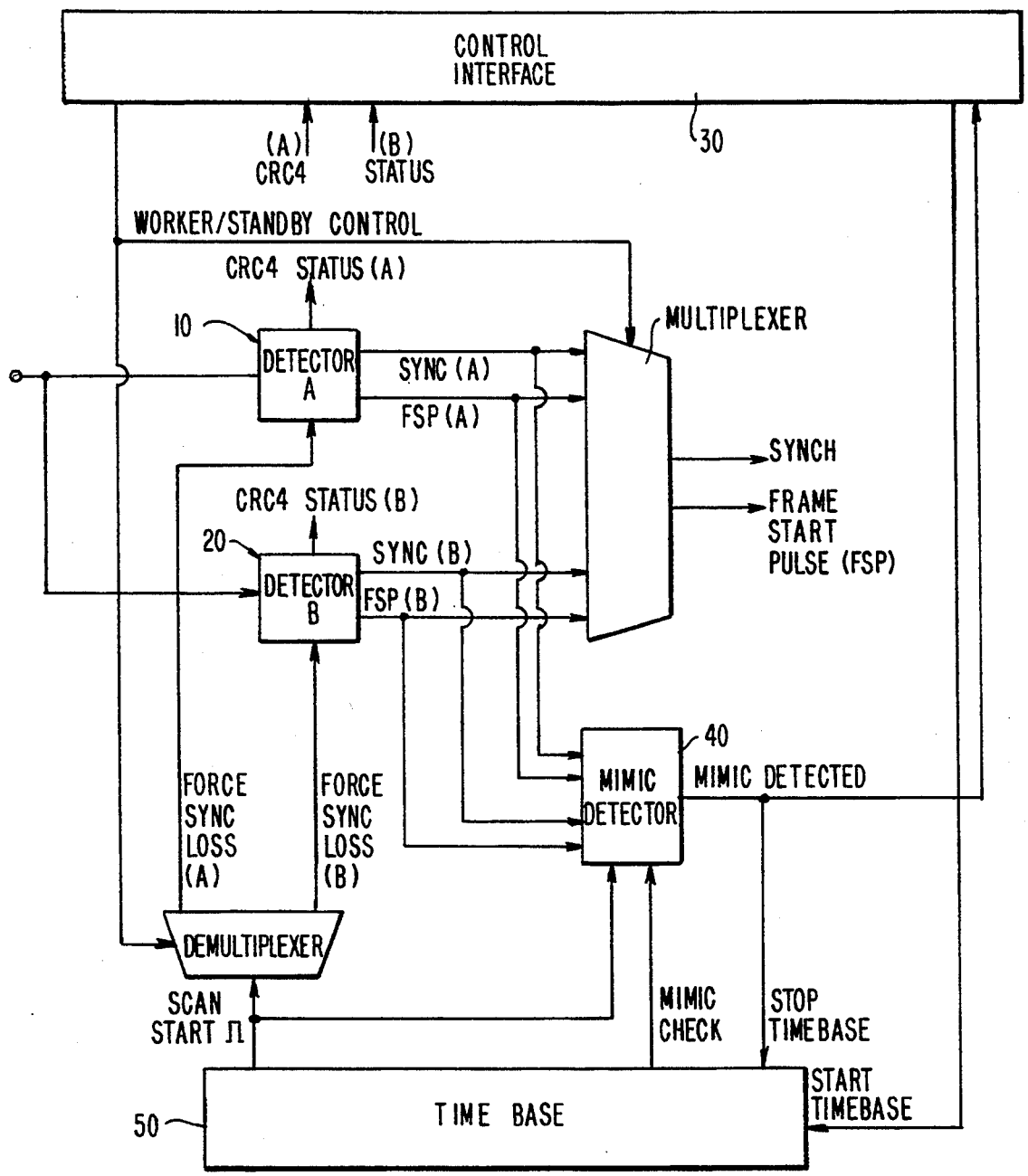

The invention will be considered with reference to DSS2 and the use of a Cyclic Redundancy Check-4 (CRC4), the use of international bits in 2 Mb/s PCM frame alignment using CRC4 being described in International Telegraph and Telephone Consultative Committee (CCITT) Blue Book, Fascicle III.4-Recommendation G.704. The procedure may be provided where there is a need for additional protection against simulation of the frame alignment signal.

It will now be described how the CRC4 signalling mechanism may be processed by a digital switch so as to provide the link security.

There are a number of basic handling criteria which must be established by the switch. These are as follows:

1) Individual PCM links must be configurable within the switch for CRC4 support. Having set CRC4 handling requirements, the following will apply:
   a) The terminating equipment for each PCM suitably configured must be told to activate CRC4 processing.
   b) Once activated, CRC4 will be generated on the transmit side of any suitably configured PCM continuously until told to do otherwise. This will include transmission of error (El bits based on CRC4 check bit errors detected on the received PCM.
   c) The PCM terminating equipment will not transmit CRC4 data on any PCM not suitably configured, even if it has the capability of doing so.
   d) If a PCM is not configured for CRC4, any multiframe alignment, CRC4 error count and E bit information provided by the terminating equipment will be ignored.
   e) CRC4 processing will only be deactivated on the PCM terminating equipment, when the PCM is no longer required to carry traffic or is reconfigured for non CRC4 processing.

2) The PCM terminating equipment will provide two TSO alignment detection circuits, worker and standby, for a received PCM. The worker is locked to the current frame alignment pattern, whilst the standby is searching for mimic alignment patterns.

If the worker loses multiframe alignment or CRC4 errors become unacceptably high and the standby has detected no mimic alignment, then CRC4 security has been lost. Should this occur, the condition should be allowed to persist for 10 seconds then an alarm should be raised and the link treated as unserviceable.

CRC4 processing should be continued both in the transmit and receive directions. When CRC4 is restored it should be allowed to persist for 20 seconds and then the link may be returned to the serviceable state.

In the presence of a mimic, detected by the standby, action will be taken based on the information supplied by the 2 circuits, as indicated below:

| Worker | | Standby | | |
|---|---|---|---|---|
| MFA | EC | MFA | EC | Action |
| Y | LO | Y | LO | If the worker CRC4 count is equal to or better than the standby, maintain the existing alignment. Otherwise, persist with the standby CRC4 for 10 seconds and, if it is consistently better, re-align. |
| Y | LO | Y | HI | Mimic timeslot 0 exists with multiframe alignment. Possible intrusion. Remain with worker and raise an alarm. |
| Y | LO | N | — | Mimic timeslot 0 exists, but with no multiframe alignment. Ignore and remain with worker. |
| Y | HO | Y | LO | The standby circuit has detected a better alignment pattern. Move to the timeslot 0 alignment found by the standby. |
| Y | HI | — | HI | CRC4 failure is high and no better alternative alignment has been detected, therefore CRC4 security is lost. Persist for 10 seconds then raise an alarm and treat the link as unserviceable. Continue with CRC4 processing, both transmit and receive. When CRC4 is restored, persist for 20 seconds and then return the link to a serviceable state. |
| N | — | Y | LO | Multiframe alignment has been lost on the worker, but an alternative is available. Move to the timeslot 0 alignment found by the standby. |
| N | — | Y | HI | Multiframe alignment has been lost. An alternative alignment is available, but it has a high error rate. Persist with the standby alignment for 10 seconds. If the error count becomes good then re-align, otherwise raise an alarm and treat the link as unserviceable. Continue with CRC4 processing, both transmit and receive. When CRCR is restored, persist for 20 seconds and then return the link to a serviceable state. |
| N | — | N | — | No multiframe alignment has been detected by either circuit, therefore CRC4 security is lost. Persist for 10 seconds, then raise an alarm and treat the link as unserviceable. Continue with CRC4 processing, both transmit and receive. When CRC4 is restored, persist for 20 seconds and then return the link to |

-continued

| Worker | | Standby | | |
|---|---|---|---|---|
| MFA | EC | MFA | EC | Action |
| | | | | a serviceable state. |

Key:
MFA = MultiFrame Alignment detected.
EC = Error Count of CRC4 errors detected.
— = Insignificant
LO = LOw count of CRC4 errors (less than or equal to 914 errored CRC blocks in 1000 per second).
HI = HIgh count of CRC4 errors (greater than 914 errored CRC blocks in 1000 per second).

The threshold value of 914 is specified by BT, but different threshold values may be set to meet the requirements of individual customers.

If the alarm should be raised on a link, due to invalid MFA or HI errored CRC4 message blocks, as described above, RAI (remote alarm indication) will be transmitted to line.

3) In addition, received E bit information is available, which identifies CRC4 errors detected at the remote end of the link. The following actions should be taken on this information, based on the current data from the worker detection circuit:

| Worker | | | |
|---|---|---|---|
| MFA | EC | EBC | Action |
| N | — | — | Ignore. PCM terminating equipment is locked to a bad timeslot 0 alignment so the E bit information is not valid. |
| Y | HI | — | Ignore. CRC4 failure is high, therefore E bit information is suspect and re-alignment or loss of link is likely to be imminent. |
| Y | LO | LO | Ignore. Remote end is not detecting significant CRC4 faults, therefore the link is good. |
| Y | LO | HI | Although received data is good, a problem exists on the transmission link. Persist for 10 seconds, then raise an alarm and treat the link as unserviceable. When the E bit count is reduced to an acceptable level then, assuming CRC4 is still good, persist for 20 seconds and return the link to a serviceable state. |

Key:
MFA = MultiFrame Alignment detected.
EC = Error Count of CRC4 errors detected
EBC = E Bit Count (CRC4 errors detected at remote end)
— = Insignificant
LO = LOw count of CRC4 / E bit errors (less than or equal to 914 errored CRC blocks in 1000 per second).
HI = HIgh count of CRC4 / E bit errors (greater than 914 errored CRC blocks in 1000 per second).

The threshold value of 914 is specified by BT, but different threshold values may be set to meet the requirements of individual customers.

4) When transmitting a timeslot 0 which has been switched, the spare bits received from the switch must be included rather than the default of all ones. Multiframe alignment must be regenerated. When receiving a timeslot 0 which is to be switched, extract the spare bits and default the international bits to 1 for subsequent retransmission. This has the following implications when switching timeslot 0 between CRC4 and non CRC4 PCMs:

CRC4 to non CRC4 connections will NOT result in multiframe alignment being transmitted to line on the non CRC4 link. By defaulting the international bits to 1, the non CRC4 terminating equipment will process timeslot 0 as if no international bits were in use on the incoming PCM.

Non CRC4 to CRC4 connections wil result in the loss of any data contained in the international bits.

Effectively, only spare bits will be switched if the PCM at either end of the connection supports CRC4.

Summarising, the function has to carry out the following:

1) To search for and algorithmically validate the presence of more than one CCITT G704 (para 2.3) compliant TSO frame synchronisation signal;
2) To search for and algorithmically validate the presence of more than one CCITT G706 (para 4) compliant CRC4 sub-multiframe synchronisation signal;
3) To accumulate TSO and CRC4 errors for each synchronised signal;
4) To process the above data in real time, accumulate historical integrity and discriminate between genuine and mimic signals.

The DSS implementation, as shown in FIG. 1, comprises two TSO detectors 10, 20 which detectors are identical and operate in 'worker/standby' configuration. The roles are reversible and are determined via the Control interface 30. The role of the worker detector should it lose sync, is to synchronise to the first valid frame alignment signal, while the standby detector is deployed to search for a 'mimic' frame alignment signal. This is done in conjunction with a 1 Hz clock 50 as follows;

1) The mimic detection mechanism 40 operates over two 1 second time windows; namely the 'scanning' and 'checking' windows.
2) At the beginning of the scanning window, the standby detector is forced to resynchronise to the next available valid frame alignment signal (FAS). There are two possibilities:
   a) There is only one valid FAS—in which case it resynchronise to the same FAS as the worker.
   b) There is more than one FAS—in which case it may resynchronise to a different FAS to that of the worker detector.
3) At the beginning of the checking window, the worker and the standby frame start pulses are compared. If they are not simultaneous, a 'mimic alarm' is raised and reported via the Control interface.
4) Once a mimic has been reported, a new scanning cycle is inhibited, leaving the standby synchronised to the new TSO. If it is again detected, a reported mimic has persisted for approximately one second. Relevant error data is analysed to determine which of the two detectors is synchronised to the genuine TSO. Should the worker TSO be deemed to be genuine, the standby scanning cycle is restarted. Should the standby TSO be deemed to be genuine, the worker/standby detector roles are reversed and the standby scanning cycle is restarted.

We claim:

1. A telecommunications system for carrying data in a frame in a series of timeslots, one of which timeslots in each frame is arranged to carry a frame alignment pattern together with a cyclic redundancy code for the pattern, the system comprising: terminating equipment including two frame alignment detectors connected in parallel, a first of the detectors being locked to a previously detected frame alignment pattern, the second of the detectors searching for an alternative frame alignment pattern, the validity of each detected frame alignment pattern being confirmed by the respective detector carrying out a cyclic redundancy check on the pattern, wherein on detection and confirmation of an alternative frame alignment pattern by the second detector, the second detector locks to that frame alignment pattern and the first detector searches for an alternative alignment pattern.

2. A telecommunications system as claimed in claim 1, wherein the first and second frame alignment detectors comprise timeslot 0 detectors operating in a worker/standby relationship.

3. A telecommunications system as claimed in claim 1, wherein the cyclic redundancy check is a CRC4 protocol.

4. A telecommunications system as claimed in claim 1, the system operating as a PCM system.

5. A telecommunications system as claimed in claim 4, the system operating as a DSS2 system.

6. A method of operating a telecommunications system wherein data is carried in a frame in a series of timeslots, one of which timeslots in each frame is arranged to carry a frame alignment pattern together with a cyclic redundancy code for the pattern, the method comprising the steps of:

(a) locking a first frame alignment detector to a previously detected frame alignment pattern;

(b) searching with a second frame alignment detector for an alternative frame alignment pattern;

(c) confirming the validity of each detected frame alignment pattern by carrying out a cyclic redundancy check on the pattern;

(d) on detection and confirmation of an alternative frame alignment pattern, locking the second detector to that frame pattern; and (e) commencing searching for an alternative frame alignment pattern with the first frame alignment detector.

7. A method as claimed in claim 6, wherein the alignment patterns are detected by checking for timeslots 0.

8. A method as claimed in claim 6, wherein the confirming step is performed by executing a CRC4 protocol.

9. A method as claimed in claim 6, wherein the method is performed on a PCM system.

10. A method as claimed in claim 9, wherein the method is performed on a DSS2 system.

* * * * *